US012639401B2

(12) United States Patent
Xu et al.

(10) Patent No.: US 12,639,401 B2
(45) Date of Patent: May 26, 2026

(54) QUANTIZATION METHOD AND DEVICE FOR NEURAL NETWORK MODEL, AND COMPUTER-READABLE STORAGE MEDIUM

(71) Applicant: Beijing Silicarisetech Co., Ltd., Beijing (CN)

(72) Inventors: Bing Xu, Hangzhou (CN); Nangeng Zhang, Hangzhou (CN)

(73) Assignee: Beijing Silicarisetech Co., Ltd., Beijing (CN)

( * ) Notice: Subject to any disclaimer, the term of this patent is extended or adjusted under 35 U.S.C. 154(b) by 1053 days.

(21) Appl. No.: 17/771,969

(22) PCT Filed: Sep. 29, 2020

(86) PCT No.: PCT/CN2020/118673
§ 371 (c)(1),
(2) Date: Apr. 26, 2022

(87) PCT Pub. No.: WO2021/082851
PCT Pub. Date: May 6, 2021

(65) Prior Publication Data
US 2022/0398413 A1 Dec. 15, 2022

(30) Foreign Application Priority Data

Oct. 31, 2019 (CN) .......................... 201911062937.0

(51) Int. Cl.
*G06F 18/21* (2023.01)
*G06N 3/02* (2006.01)

(52) U.S. Cl.
CPC ........... *G06F 18/2163* (2023.01); *G06N 3/02* (2013.01)

(58) Field of Classification Search
CPC ............................. G06F 18/2163; G06N 3/02
See application file for complete search history.

(56) References Cited

U.S. PATENT DOCUMENTS

2019/0095795 A1 3/2019 Ren et al.

FOREIGN PATENT DOCUMENTS

| CN | 106326985 A | 1/2017 |
| CN | 106557812 A | 4/2017 |

(Continued)

OTHER PUBLICATIONS

Linghua Zeng, Zhangcheng Wang, and Xinmei Tian. Aug. 10, 2019 . KCNN: kernel-wise quantization to remarkably decrease multiplications in convolutional neural network. In Proceedings of the 28th International Joint Conference on Artificial Intelligence (IJCAI'19). AAAI Press, 4234-4242. (Year: 2019).*

(Continued)

*Primary Examiner* — Kannan Shanmugasundaram

(74) *Attorney, Agent, or Firm* — Blank Rome LLP

(57) ABSTRACT

A quantization method and device for a neural network model, and a computer-readable storage medium are provided. The method includes determining, from a neural network model, a target convolution kernel having an abnormal coefficient distribution, splitting the target convolution kernel so as to obtain a plurality of sub-convolution kernels, quantizing the plurality of sub-convolution kernels respectively to obtain a plurality of quantized convolution kernels, and replacing the target convolution kernel with the plurality of quantized convolution kernels. The method can reduce quantization errors.

15 Claims, 4 Drawing Sheets

(56)        References Cited

FOREIGN PATENT DOCUMENTS

| | | | | | | |
|----|------------|----|---|--------|------------|----------|
| CN | 109840589  | A  | * | 6/2019 | | |
| CN | 110059796  | A  |   | 7/2019 | | |
| WO | WO-2019109795 | A1 | * | 6/2019 | ............ | G06F 17/15 |

OTHER PUBLICATIONS

Zhao, Ritchie, et al. "Improving neural network quantization without retraining using outlier channel splitting." International conference on machine learning. PMLR., Jun. 9-15, 2019. (Year: 2019).*

* cited by examiner

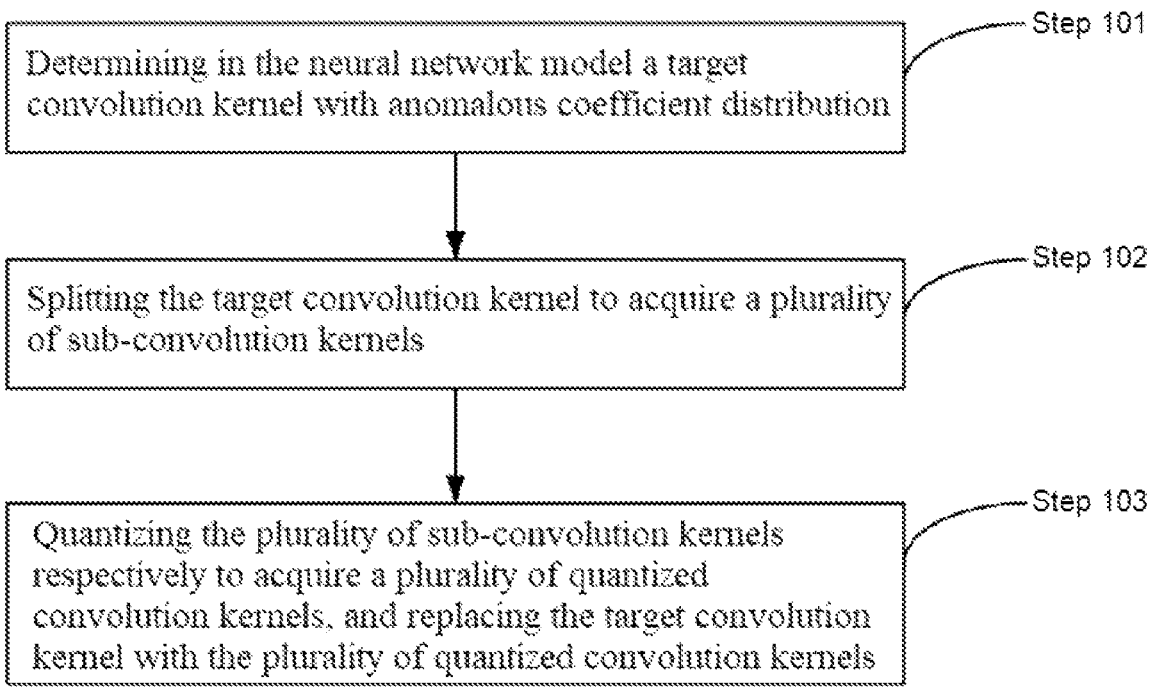

Determining in the neural network model a target convolution kernel with anomalous coefficient distribution ⟶ Step 101

Splitting the target convolution kernel to acquire a plurality of sub-convolution kernels ⟶ Step 102

Quantizing the plurality of sub-convolution kernels respectively to acquire a plurality of quantized convolution kernels, and replacing the target convolution kernel with the plurality of quantized convolution kernels ⟶ Step 103

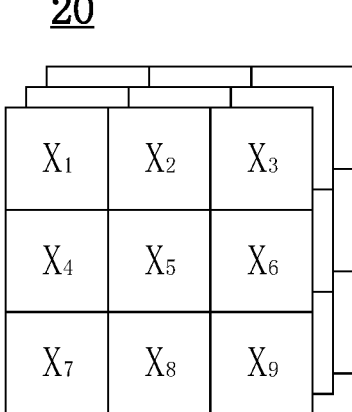

FIG. 2

QUANTIZATION METHOD AND DEVICE FOR NEURAL NETWORK MODEL, AND COMPUTER-READABLE STORAGE MEDIUM

CROSS-REFERENCE TO RELATED APPLICATIONS

This application is a National Stage of International patent application PCT/CN2020/118673, filed on Sep. 29, 2020, which claims priority to foreign Chinese patent application No. CN 201911062937.0, filed on Oct. 31, 2019, the disclosures of which are incorporated by reference in their entirety.

TECHNICAL FIELD

The present disclosure relates to the field of neural network computation, in particular to a method and an apparatus for quantizing in a neural network model, and a computer-readable storage medium.

BACKGROUND

This section is intended to provide background or context to the embodiments of the present disclosure as set forth in claims. What is described in this section is not admitted to be prior art by virtue of its inclusion in this section.

In recent years, the scale of deep neural networks has continuously increased, which in turn causes the trained neural network models to include a large number of parameters, the storage and transmission of which may lead to a rather great computational cost and power consumption. These drawbacks may particularly limit the deployment or application of the neural network models to edge devices or low-power devices.

In general, a method of quantizing coefficients of the trained neural network models may be adopted to solve the problem of excessive computational load in the neural network models. However, the quantization scheme in the prior art for the neural network model is still unideal, and may easily lead to problems such as excessive quantization errors and thus affect the computation performance of the neural network model.

SUMMARY

To solve the aforesaid problem in the prior art that tends to cause excessive quantization errors while quantizing in the neural network model, embodiments of the present disclosure provide a method and apparatus for quantizing in a neural network model, and a computer-readable storage medium. The aforesaid problem can be solved by applying this method and apparatus.

Embodiments of the present disclosure provide following solutions.

In a first aspect, a method of quantizing in a neural network model is provided. The method includes: determining in the neural network model a target convolution kernel with anomalous coefficient distribution; splitting the target convolution kernel to acquire a plurality of sub-convolution kernels; and quantizing the plurality of sub-convolution kernels respectively to acquire a plurality of quantized convolution kernels, and replacing the target convolution kernel with the plurality of quantized convolution kernels.

In some possible embodiments, determining in the neural network model the target convolution kernel with anomalous coefficient distribution includes: acquiring any one convolution kernel to be quantized in the neural network model; determining a first threshold value based on a standard deviation of coefficient distribution of a plurality of coefficients included in the convolution kernel to be quantized; determining a difference value between a mean value and a maximum value and/or a minimum value of the plurality of coefficients included in the convolution kernel to be quantized; and determining, when the difference value exceeds the first threshold value, that the convolution kernel to be quantized is the target convolution kernel.

In some possible embodiments, splitting the target convolution kernel includes: determining an anomalously distributed coefficient in the target convolution kernel; and splitting the target convolution kernel based on the anomalously distributed coefficient.

In some possible embodiments, determining the anomalously distributed coefficient in the target convolution kernel includes: determining a second threshold value based on a standard deviation of coefficient distribution of a plurality of coefficients included in the target convolution kernel; and determining the anomalously distributed coefficient in the target convolution kernel based on the determined second threshold.

In some possible embodiments, splitting the target convolution kernel based on the anomalously distributed coefficient includes: dividing the anomalously distributed coefficient in the target convolution kernel to acquire a plurality of divided coefficients that are non-anomalous; forming a plurality of groups using the plurality of divided coefficients, where each group includes any one of the plurality of divided coefficients; allocating a plurality of non-anomalously distributed coefficients in the target convolution kernel to the plurality of groups, respectively, where each group includes at least one of the plurality of non-anomalously distributed coefficients; and forming the plurality of sub-convolution kernels using the plurality of groups containing the non-anomalously distributed coefficients and the divided coefficients, respectively.

In some possible embodiments, dividing the anomalously distributed coefficient in the target convolution kernel to acquire the plurality of divided coefficients that are non-anomalous includes: bisecting at least once the anomalously distributed coefficient by dichotomy until the plurality of non-anomalous divided coefficients are acquired, where whether the plurality of divided coefficients are non-anomalous is determined based on the second threshold.

In some possible embodiments, allocating the plurality of non-anomalously distributed coefficients in the target convolution kernel to the plurality of groups respectively includes: allocating the plurality of non-anomalously distributed coefficients to the plurality of groups based on a uniform extraction operation, such that the plurality of non-anomalously distributed coefficients are uniformly distributed in the plurality of sub-convolution kernels.

In some possible embodiments, quantizing the plurality of sub-convolution kernels respectively includes: determining a quantization boundary based on coefficient distribution of the plurality of sub-convolution kernels; and linearly-quantizing each of the plurality of sub-convolution kernels based on the determined quantization boundary and a target quantization bit width.

In second aspect, an apparatus for quantizing in a neural network model is provided. The apparatus includes: a determination module configured to determine in the neural network model a target convolution kernel with anomalous coefficient distribution; a splitting module configured to split the target convolution kernel to acquire a plurality of sub-convolution kernels; and a quantization module configured to quantize the plurality of sub-convolution kernels respectively to acquire a plurality of quantized convolution kernels, and replace the target convolution kernel with the plurality of quantized convolution kernels.

In some possible embodiments, the determination module is configured to: acquire any one convolution kernel to be quantized in the neural network model; determine a first threshold value based on a standard deviation of coefficient distribution of a plurality of coefficients included in the convolution kernel to be quantized; determine a difference value between a mean value and a maximum value and/or a minimum value of the plurality of coefficients included in the convolution kernel to be quantized; and determine, when the difference value exceeds the first threshold value, that the convolution kernel to be quantized is the target convolution kernel.

In some possible embodiments, the splitting module is configured to determine an anomalously distributed coefficient in the target convolution kernel, and split the target convolution kernel based on the anomalously distributed coefficient.

In some possible embodiments, the splitting module is configured to determine a second threshold value based on a standard deviation of coefficient distribution of a plurality of coefficients included in the target convolution kernel, and determine the anomalously distributed coefficient in the target convolution kernel based on the determined second threshold.

In some possible embodiments, the splitting module is configured to: divide the anomalously distributed coefficient in the target convolution kernel to acquire a plurality of divided coefficients that are non-anomalous; form a plurality of groups using the plurality of divided coefficients, where each group includes any one of the plurality of divided coefficients; allocate a plurality of non-anomalously distributed coefficients in the target convolution kernel to the plurality of groups, respectively, where each group includes at least one of the plurality of non-anomalously distributed coefficients; and form the plurality of sub-convolution kernels using the plurality of groups containing the non-anomalously distributed coefficients and the divided coefficients, respectively.

In some possible embodiments, the splitting module is configured to: bisect at least once the anomalously distributed coefficient by dichotomy until the plurality of non-anomalous divided coefficients are acquired, where whether the plurality of divided coefficients are non-anomalous is determined based on the second threshold.

In some possible embodiments, the splitting module is configured to: allocate the plurality of non-anomalously distributed coefficients to the plurality of groups based on a uniform extraction operation, such that the plurality of non-anomalously distributed coefficients are uniformly distributed in the plurality of sub-convolution kernels.

In some possible embodiments, the quantization module is configured to: determine a quantization boundary based on coefficient distribution of the plurality of sub-convolution kernels, and quantize each of the plurality of sub-convolution kernels based on the determined quantization boundary and a target quantization bit width.

In a third aspect, an apparatus for quantizing in a neural network model is provided. The apparatus includes: at least one processor; and a memory, communicatively connected to the at least one processor; where the memory has instructions executable by the at least one processor stored therein, the instructions, when executed by the at least one processor, causing the at least one processor to perform following operations of: determining in the neural network model a target convolution kernel with anomalous coefficient distribution; splitting the target convolution kernel to acquire a plurality of sub-convolution kernels; and quantizing the plurality of sub-convolution kernels respectively to acquire a plurality of quantized convolution kernels, and replacing the target convolution kernel with the plurality of quantized convolution kernels.

In a fourth aspect, provided is a computer-readable storage medium having programs stored thereon, where the programs, when executed by a multicore processor, cause the multicore processor to implement the method according to the first aspect.

At least one of the technical solutions adopted in the present disclosure can achieve the following beneficial effects. By splitting a target convolution kernel having an anomalous parameter distribution in the neural network model, a plurality of sub-convolution kernels are acquired and then quantized respectively to realize fixed-point quantization of the target convolution kernel, thereby reducing the quantization error.

It should be understood that, the above description only shows a summary of the technical solutions of the invention for better understanding the technical measures of the invention so as to implement the invention according to the contents of the disclosure. In order to make the above and other objects, characteristics and advantages of the invention more apparent, specific embodiments of the invention will be illustrated below by examples.

BRIEF DESCRIPTION OF THE DRAWINGS

By reading following details of the exemplary embodiments below, those of ordinary skills in the art may understand the advantages and benefits described herein and other advantages and benefits. The accompanying drawings are for the purpose of illustrating exemplary embodiments only and are not intended to be a limitation of the present disclosure. Further, a same reference sign is adopted to indicate a same component throughout the accompanying drawings. In the accompanying drawings:

FIG. 1 is a schematic flowchart of a method of quantizing in a neural network model according to an embodiment of the present disclosure;

FIG. 2 is a schematic structural diagram of a schematic target convolution kernel;

Figure 3:
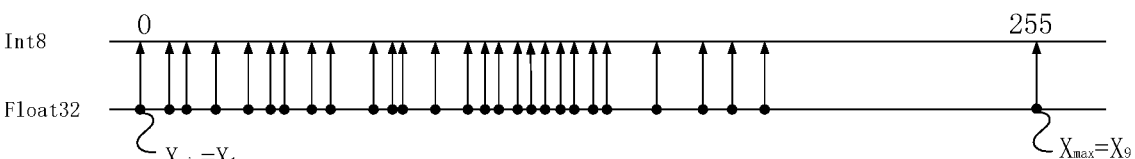
FIG. 3 is a schematic diagram for directly linearly-quantizing the target convolution kernel shown in FIG. 2.

In the accompanying drawings, the same or corresponding reference signs indicate same or corresponding portions.

DETAILED DESCRIPTION

Exemplary embodiments of the present disclosure will be described below in more detail with reference to the accompanying drawings. Although the accompanying drawings illustrate exemplary embodiments of the present disclosure, it should be understood that the present disclosure can be implemented in various forms and should not be construed as limited to embodiments described herein. Rather, these embodiments are provided so that the present disclosure will be understood thoroughly, and will fully convey the scope of the present disclosure to those skilled in the art.

In the present disclosure, it should be understood that terms such as "include" or "have" are intended to indicate the existence of the characteristics, figures, steps, actions, components and parts disclosed by the specification or a combination thereof, without excluding the existence of one or more other characteristics, figures, steps, actions, components, parts or a combination thereof.

Furthermore, it should be noted that, in the case of no conflict, the embodiments of the present disclosure and features of the embodiments may be combined with each other in any manner. The present disclosure will be described in detail below with reference to the accompanying drawings and embodiments.

The trained neural network may have floating-point parameters, such as weight parameters with 32 bits of floating-point precision. However, the floating-point parameters, compared to the fixed-point parameters, may require a greater number of operations and more frequent memory accesses. For this reason, in order to reduce the number of operations, the floating-point parameters in the neural network model may be quantized by converting the floating-point numbers to fixed-point parameters with a specific number of bits, such as weight parameters with 32 bits of fixed-point precision. The device deploying the neural network may for example be an autonomous vehicle, a robot, a smart phone, a tablet device, an augmented reality (AR) device, an Internet of Things (IoT) device or other devices that can perform speech recognition, image recognition and the like with a neural network, but the present disclosure is not limited thereto.

Embodiments of the present disclosure provide a method of quantizing in a neural network model. FIG. 1 is a schematic flowchart of a method 100 for quantizing in a neural network model according to an embodiment of the present disclosure.

As shown in FIG. 1, the method 100 includes following steps:

Step 101: Determining in the neural network model a target convolution kernel with anomalous coefficient distribution;

Step 102: Splitting the target convolution kernel to acquire a plurality of sub-convolution kernels; and Step 103: Quantizing the plurality of sub-convolution kernels respectively to acquire a plurality of quantized convolution kernels, and replacing the target convolution kernel with the plurality of quantized convolution kernels.

Specifically, the neural network model may include a plurality of convolution kernels to be quantized, and the target convolution kernel with anomalous coefficient distribution may be determined from the plurality of convolution kernels to be quantized. The anomalous coefficient distribution may indicate that the plurality of coefficients included in the target convolution kernel are not in a normal distribution, or the plurality of coefficients included in the target convolution kernel are distributed non-uniformly or non-intensively.

In embodiments of the present disclosure, the quantization may refer to linear quantization. In general, the linear quantization achieves the quantization by mapping all coefficients of the target convolution kernel from a more dense data space (e.g., 32-bit floating point number, hereinafter referred to as F32) to a more sparse space (e.g., 8-bit fixed point number, hereinafter referred to as INT8) according to some mapping relationship. The quantization method is generally implemented by finding the distribution range $[X_{min}, X_{max}]$ of all coefficients included in the target convolution kernel. Provided that the quantized target quantization bit width is INT8, the aforesaid linear quantization, since the expression range of INT8 is [0,255], is equivalent to allocating $[X_{min}, X_{max}]$ into 255 groups evenly and converting the floating-point coefficients falling into each group as the corresponding fixed-point expression. For example, $X_{min}$ is converted as 0, and $X_{max}$ is converted as 255.

For example, FIG. 2 shows a 3×3×3 target convolution kernel 20, which includes 27 floating-point coefficients $X_1$, $X_2$, $X_3$, . . . (coefficients $X_{10}$ to $X_{27}$ are not shown in the figure). It is assumed that the maximum value $X_{max}$ of the 27 floating-point coefficients is $X_9$, and the minimum value $X_{min}$, is $X_1$, and that $X_9$ among the 27 coefficients is more discrete than the others. Further, FIG. 3 is a schematic diagram for directly linearly-quantizing the 27 floating-point coefficients included in the target convolution kernel 20. As shown, in the case of directly linearly-quantizing the plurality of coefficients of the target convolution kernel, if $X_{max}=X_9$ is enabled to be represented by the correct fixed point without increasing the quantization bit width, the accuracy of other coefficients that are distributed normally may necessarily be decreased. In contrast, if saturation is done directly on $X_{max}$, the performance may be degraded.

Figure 4:
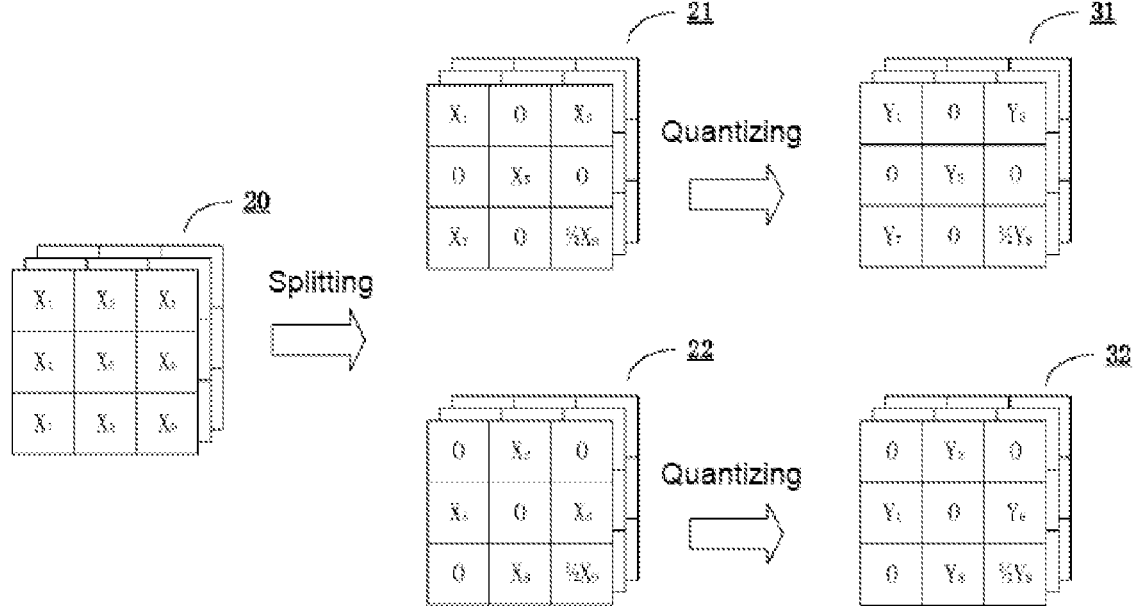
FIG. 4 is a schematic diagram for performing quantization after splitting the target convolution kernel shown in FIG. 2.

In embodiments of the present disclosure, as shown in FIG. 4, the target convolution kernel 20 may be split into a sub-convolution kernel 21 and a sub-convolution kernel 22. The sum of the two sub-convolution kernels is equal to the target convolution kernel 20, and the null coefficient positions in each sub-convolution kernel are indicated by a factor 0. The sub-convolution kernel 21 and sub-convolution kernel 22 that are distributed uniformly may be acquired in a one-by-one extraction manner as shown in FIG. 4. Optionally, other splitting manners are also possible. For example, the plurality of coefficients of the target convolution kernel may be grouped into a plurality of groups according to the coefficient size, and then the sub-convolution kernel is determined according to coefficients of each of the groups. This embodiment does not specifically limit the splitting manner. Optionally, the target convolution kernel 20 may also be split into more sub-convolution kernels, and this embodiment does not specifically limit the number of sub-convolution kernels. Further, as shown in FIG. 4, the sub-convolution kernel 21 and the sub-convolution kernel 22 may be quantized separately to acquire a quantized convolution kernel 31 and a quantized convolution kernel 32. Since the coefficient distribution range of each sub-convolution kernel is at least partially reduced compared to that of the original target convolution kernel 20, the quantized convolution kernels as acquired by quantizing each sub-convolution kernel have a smaller quantization error. Thus, for the target convolution kernel with anomalous coefficient distribution, the convolution kernel is split as described above, and then a plurality of sub-convolution kernels as acquired from the splitting is quantized to acquire a plurality of quantized convolution kernels for achieving quantization of the target convolution kernel, thereby reducing the quantization error of the target convolution kernel with anomalous coefficient distribution.

Based on the method of quantizing in the neural network model in FIG. 1, some embodiments of the present disclosure further provide some specific implementation solutions and extended solutions of the method, which will be described below.

In some possible embodiments, step 101 includes: acquiring any one convolution kernel to be quantized in the neural network model; determining a first threshold value based on a standard deviation of coefficient distribution of a plurality of coefficients included in the convolution kernel to be quantized; determining a difference value between a mean value and a maximum value and/or a minimum value of the plurality of coefficients included in the convolution kernel to be quantized; and determining, when the difference value exceeds the first threshold value, that the convolution kernel to be quantized is the target convolution kernel.

Optionally, the first threshold value is preferably taken to be 3 to 6 times the standard deviation of coefficient distribution of the plurality of coefficients included in the convolution kernel to be quantized, thereby causing no significant performance loss.

Optionally, the histogram of the coefficient distribution of the plurality of coefficients included in any one convolution kernel to be quantized may also be analyzed to determine whether the convolution kernel to be quantized is a target convolution kernel.

Figure 5:
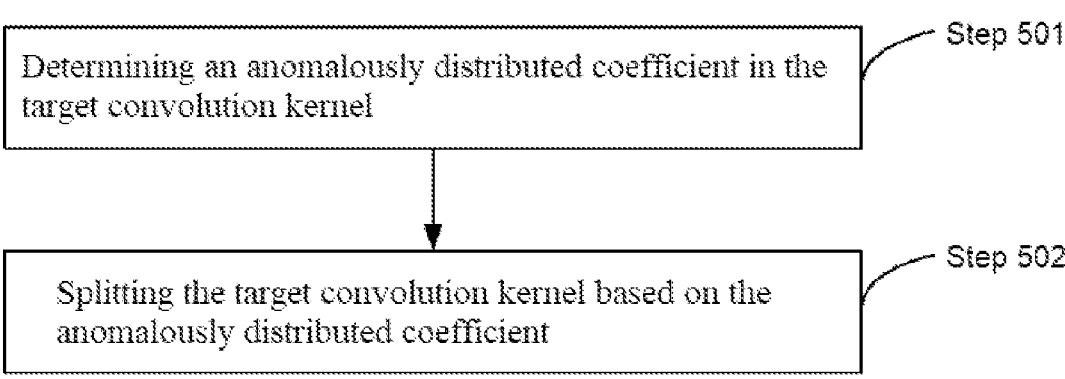
FIG. 5 is a schematic flowchart of a method of quantizing in a neural network model according to another embodiment of the present disclosure.

In some possible embodiments, as shown in FIG. 5, step 102 may include following steps:

Step 501: Determining an anomalously distributed coefficient in the target convolution kernel; and Step 502: Splitting the target convolution kernel based on the anomalously distributed coefficient.

Specifically, one or more of the plurality of coefficients of the target convolution kernel that do not obey a normal distribution may be identified as the anomalously distributed coefficient. For example, as shown in FIG. 2, the anomalously distributed coefficient in the target convolution kernel 20 may be $X_9$.

In some possible embodiments, step 501 includes: determining a second threshold value based on a standard deviation of coefficient distribution of a plurality of coefficients included in the target convolution kernel; and determining the anomalously distributed coefficient in the target convolution kernel based on the determined second threshold.

Specifically, the second threshold may be taken to be 3 to 6 times the standard deviation of coefficient distribution of the plurality of coefficients included in the target convolution kernel, or the second threshold may be determined directly based on the first threshold. For example, after determining that the convolution kernel A to be quantized is the target convolution kernel, the first threshold of the convolution kernel A to be quantized may directly serve as the second threshold of the target convolution kernel to avoid repeated operations, and the two thresholds are equivalent. Determining the anomalously distributed coefficient in the target convolution kernel based on the determined second threshold may include: determining a difference value between a mean value of the plurality of coefficients and each coefficient included in the target convolution kernel, and finding one or more anomalously distributed parameters in the target convolution kernel by determining whether the difference value exceeds the second threshold.

Figure 6:
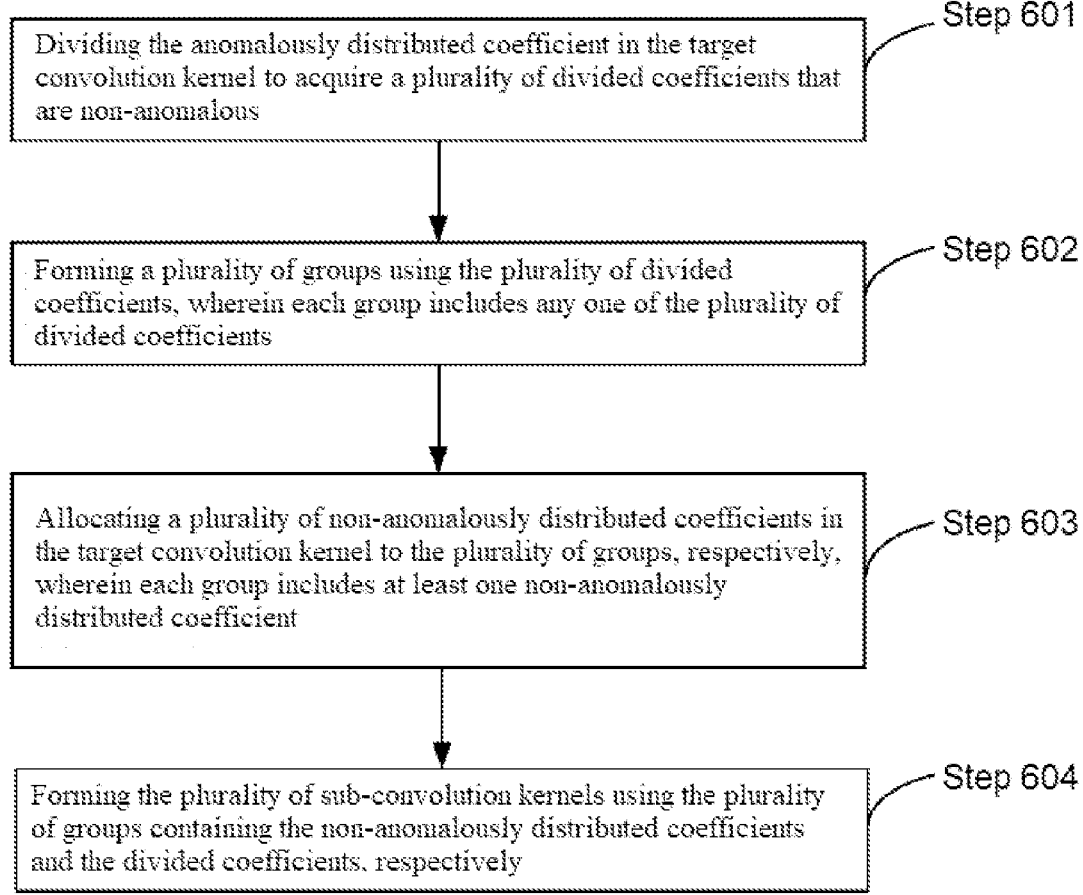
FIG. 6 is a schematic flowchart of a method of quantizing in a neural network model according to still another embodiment of the present disclosure.

In some possible embodiments, as shown in FIG. 6, step 502 may include following steps:

Step 601: Dividing the anomalously distributed coefficient in the target convolution kernel to acquire a plurality of divided coefficients that are non-anomalous;

Step 602: Forming a plurality of groups using the plurality of divided coefficients, each group including any one of the plurality of divided coefficients;

Step 603: Allocating a plurality of non-anomalously distributed coefficients in the target convolution kernel to the plurality of groups, respectively, each group including at least one of the plurality of non-anomalously distributed coefficients; and Step 604: Forming the plurality of sub-convolution kernels using the plurality of groups containing the non-anomalously distributed coefficients and the divided coefficients, respectively.

For example, as shown in FIG. 2, the target convolution kernel 20 includes an anomalously distributed coefficient $X_9$ and a plurality of non-anomalously distributed coefficients. Two divided coefficients $\frac{1}{2}X_9$ that are non-anomalous are acquired by dividing the anomalously distributed coefficient $X_9$, and the plurality of coefficients included in the target convolution kernel 20 is grouped into two groups, each group including one $\frac{1}{2}X_9$. Then, each non-anomalously distributed coefficient is grouped into either of the two groups, such that a sub-convolution kernel 21 and a sub-convolution kernel 22 are formed.

In some possible embodiments, step 601 may include: bisecting at least once the anomalously distributed coefficient by dichotomy until the plurality of non-anomalous divided coefficients are acquired, and whether the plurality of divided coefficients are non-anomalous is determined based on the second threshold.

For example, two divisional parameters $\frac{1}{2}X_9$ are acquired by performing a first bisection on the anomalously distributed coefficient $X_9$ by dichotomy. However, in some cases, $\frac{1}{2}X_9$ may still be an anomalously distributed coefficient. Thus, further bisection may be performed on $\frac{1}{2}X_9$ to acquire four divisional parameters $\frac{1}{4}X_9$, and so forth until all the divisional parameters acquired are non-anomalously distributed.

In some possible embodiments, step 603 may include: allocating the plurality of non-anomalously distributed coefficients to the plurality of groups based on a uniform extraction operation, such that the plurality of non-anomalously distributed coefficients are uniformly distributed in the plurality of sub-convolution kernels.

For example, referring to FIG. 4, the sub-convolution kernel 21 may include $(X_1, 0, X_3, 0, X_5, 0, X_7, 0, \frac{1}{2}X_9, \ldots)$; and the sub-convolution kernel 21 may include $(0, X_2, 0, X_4, 0, X_6, 0, X_8, \frac{1}{2}X_9, \ldots)$.

In some possible embodiments, step 103 may include: determining a quantization boundary based on coefficient distribution of the plurality of sub-convolution kernels; and quantizing each of the plurality of sub-convolution kernels based on the determined quantization boundary and a target quantization bit width.

For example, as shown in FIG. 4, the sub-convolution kernel 21 may be linearly-quantized to acquire a quantized convolution kernel 31, and the sub-convolution kernel 22 may be linearly-quantized to acquire a quantized convolution kernel 32. The original target convolution kernel 20 is replaced by the quantized convolution kernel 31 and the quantized convolution kernel 32 in the neural network model to perform the fixed-point type of neural network operations.

Figure 7:
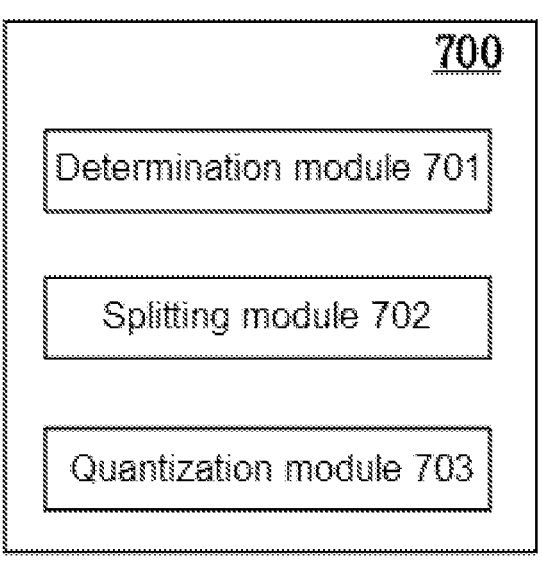
FIG. 7 is a schematic structural diagram of an apparatus for quantizing in a neural network model according to an embodiment of the present disclosure.

Based on the same technical concept, embodiments of the present disclosure further provide an apparatus for quantizing in a neural network model to perform the method of quantizing in the neural network model according to any one of the aforesaid embodiments. FIG. 7 is a schematic structural diagram of an apparatus for quantizing in a neural network model according to an embodiment of the present disclosure.

As shown in FIG. 7, the apparatus 700 may include:

a determination module 701 configured to determine in the neural network model a target convolution kernel with anomalous coefficient distribution;

a splitting module 702 configured to split the target convolution kernel to acquire a plurality of sub-convolution kernels; and a quantization module 703 configured to quantize the plurality of sub-convolution kernels respectively to acquire a plurality of quantized convolution kernels, and replace the target convolution kernel with the plurality of quantized convolution kernels.

In some possible embodiments, the determination module 701 is configured to: acquire any one convolution kernel to be quantized in the neural network model; determine a first threshold value based on a standard deviation of coefficient distribution of a plurality of coefficients included in the convolution kernel to be quantized; determine a difference value between a mean value and a maximum value and/or a minimum value of the plurality of coefficients included in the convolution kernel to be quantized; and determine, when the difference value exceeds the first threshold value, that the convolution kernel to be quantized is the target convolution kernel.

In some possible embodiments, the splitting module 702 is configured to determine an anomalously distributed coefficient in the target convolution kernel, and split the target convolution kernel based on the anomalously distributed coefficient.

In some possible embodiments, the splitting module 702 is configured to determine a second threshold value based on a standard deviation of coefficient distribution of a plurality of coefficients included in the target convolution kernel, and determine the anomalously distributed coefficient in the target convolution kernel based on the determined second threshold.

In some possible embodiments, the splitting module 702 is configured to: divide the anomalously distributed coefficient in the target convolution kernel to acquire a plurality of divided coefficients that are non-anomalous; form a plurality of groups using the plurality of divided coefficients, each group including any one of the plurality of divided coefficients; allocate a plurality of non-anomalously distributed coefficients in the target convolution kernel to the plurality of groups, respectively, each group including at least one of the plurality of non-anomalously distributed coefficients; and form the plurality of sub-convolution kernels using the plurality of groups containing the non-anomalously distributed coefficients and the divided coefficients, respectively.

In some possible embodiments, the splitting module 702 is configured to: bisect at least once the anomalously distributed coefficient by dichotomy until the plurality of non-anomalous divided coefficients are acquired, and whether the plurality of divided coefficients are non-anomalous is determined based on the second threshold.

In some possible embodiments, the splitting module 702 is configured to: allocate the plurality of non-anomalously distributed coefficients to the plurality of groups based on a uniform extraction operation, such that the plurality of non-anomalously distributed coefficients are uniformly distributed in the plurality of sub-convolution kernels.

In some possible embodiments, the quantization module 703 is configured to: determine a quantization boundary based on coefficient distribution of the plurality of sub-convolution kernels, and quantize each of the plurality of sub-convolution kernels based on the determined quantization boundary and a target quantization bit width.

It should be noted that the apparatus for quantizing in the neural network model in embodiments of the present disclosure may implement various process of the method of quantizing in the neural network model and can achieve the same effect and function, which will not be repeated here.

Figure 8:
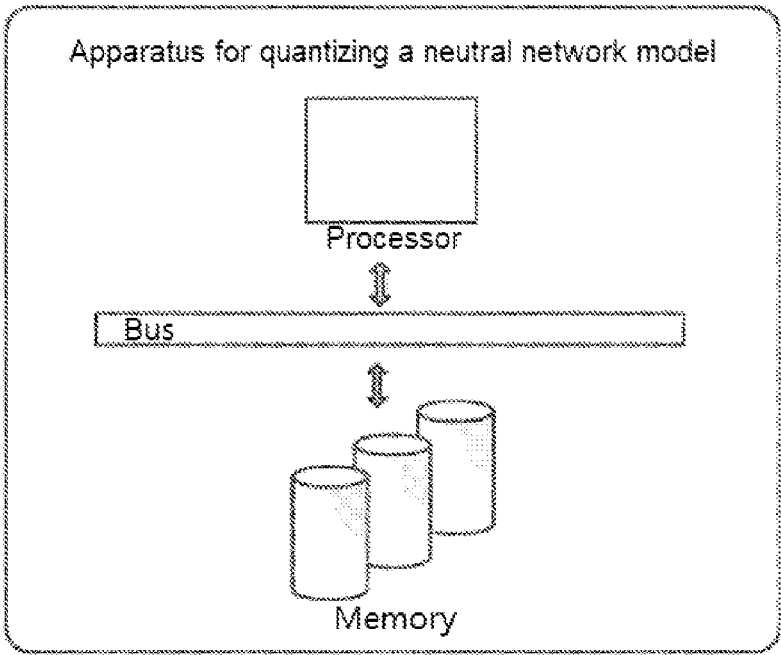
FIG. 8 is a schematic structural diagram of an apparatus for quantizing in a neural network model according to another embodiment of the present disclosure.

FIG. 8 is a schematic diagram of an apparatus for quantizing in a neural network model according to an embodiment of the present disclosure for implementing the method of quantizing in the neural network model as shown in FIG. 1. The apparatus includes: at least one processor; and a memory, communicatively connected to the at least one processor; where the memory has instructions executable by the at least one processor stored therein, the instructions, when executed by the at least one processor, causing the at least one processor to perform following operations of: determining in the neural network model a target convolution kernel with anomalous coefficient distribution; splitting the target convolution kernel to acquire a plurality of sub-convolution kernels; and quantizing the plurality of sub-convolution kernels respectively to acquire a plurality of quantized convolution kernels, and replacing the target convolution kernel with the plurality of quantized convolution kernels.

An embodiment of the present disclosure provides a computer-readable storage medium having programs stored thereon. The programs, when executed by a multicore processor, cause the multicore processor to implement operations of: determining in the neural network model a target convolution kernel with anomalous coefficient distribution, splitting the target convolution kernel to acquire a plurality of sub-convolution kernels, and quantizing the plurality of sub-convolution kernels respectively to acquire a plurality of quantized convolution kernels, and replacing the target convolution kernel with the plurality of quantized convolution kernels.

The respective embodiments of the present disclosure are described in a progressive manner. The reference may be made to each other for the same or similar parts of the respective embodiments, and each embodiment focuses on the differences from other embodiments. Especially, for the embodiments of the device, apparatus and computer-readable storage medium, since they basically correspond to the embodiments of the method, they are described in a simple way, and reference may be made to the description part on embodiments of the method for relevant points.

The apparatus and computer-readable storage medium according to embodiments of the present disclosure correspond to the method one by one. Thus, the apparatus and computer-readable storage medium have similar beneficial technical effects with the corresponding method. Since the beneficial technical effects of the method have been described in detail above, the beneficial technical effects of the apparatus and computer-readable storage medium will not be repeated here.

Those skilled in the art should understand that the embodiments of the present disclosure may be provided as a method, a system, or a computer program product. Therefore, the present disclosure may be in the form of full hardware embodiments, full software embodiments, or a combination thereof. Moreover, the present disclosure may be in the form of a computer program product that is implemented on one or more computer-usable storage medium (which includes, but is not limited to, magnetic disk storage, CD-ROM, optical storage) containing computer-usable program codes.

The present disclosure is described referring to the flowchart and/or block diagram of the method, device (system) and computer program product according to the embodiments of the present disclosure. It should be understood that, each flow and/or block in the flowchart and/or block diagram and the combination of flow and/or block in the flowchart and/or block diagram may be realized via computer program instructions. Such computer program instructions may be provided to the processor of a general-purpose computer, special-purpose computer, a built-in processor or other programmable data processing devices to produce a machine, such that the instructions executed by the processor of a computer or other programmable data processing devices may produce a device for realizing the functions specified in one or more flows in the flowchart and/or one or more blocks in the block diagram.

Such computer program instructions may also be stored in a computer-readable storage that can guide a computer or other programmable data processing devices to work in a specific mode, such that the instructions stored in the computer-readable storage may produce a manufacture including a commander equipment, where the commander equipment may realize the functions specified in one or more flows of the flowchart and one or more blocks in the block diagram.

Such computer program instructions may also be loaded to a computer or other programmable data processing devices, such that a series of operational processes may be executed on the computer or other programmable devices to produce a computer-realized processing, and thereby the instructions executed on the computer or other programmable devices may provide a process for realizing the functions specified in one or more flows in the flowchart and/or one or more blocks in the block diagram.

In a typical configuration, the computing device includes one or more processors (CPU), an input/output interface, a network interface, and a memory.

The memory may include a non-permanent memory in a computer-readable medium, a random access memory (RAM) and/or a non-volatile memory, such as a read-only memory (ROM) or a flash memory (flash RAM). The memory is an example of a computer-readable medium.

The computer-readable medium may be permanent and non-permanent, or removable and non-removable media, which can achieve the information storage by any method or technology. The information may be computer-readable instructions, data structures, program modules, or other data. Examples of the computer storage medium include, but are not limited to, a phase change memory (PRAM), a static random access memory (SRAM), a dynamic random access memory (DRAM), other types of random access memory (RAM), read-only memory (ROM), an electrically erasable programmable read-only memory (EEPROM), a flash memory or other memory technologies, a CD-ROM, a digital versatile disc (DVD) or other optical storage, and a magnetic cassette tape. The magnetic tape storage or other magnetic storage devices or any other non-transmission medium may be used to store information that can be accessed by computing devices. Furthermore, although the operations of the method of the present disclosure are described in a specific order in drawings, it does not require or imply that the operations must be performed in the specific order, or that the desired result can only be achieved if all the operations as shown are performed. Additionally or alternatively, some steps may be omitted, multiple steps may be combined into one step for execution, and/or one step may be decomposed into multiple steps for execution.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

Although the spirit and principles of the present disclosure have been described with reference to several embodiments, it shall be understood that the present disclosure is not limited to the embodiments as disclosed, nor does the division of the aspects imply that the features in those aspects cannot be combined for benefit, such division being for convenience of presentation only. The present disclosure is intended to cover various modifications and equivalent arrangements included within the spirit and scope of the appended claims.

What is claimed is:

1. A method for quantizing in a neural network model deployed on an edge device or a low-power device, the method being executed by at least one processor, the method comprising:

determining, in the neural network model, a target convolution kernel with anomalous coefficient distribution, wherein the anomalous coefficient distribution negatively impacts quantization accuracy if directly quantized;

splitting the target convolution kernel to acquire a plurality of sub-convolution kernels comprising the following steps:

determining an anomalously distributed coefficient in the target convolution kernel;

dividing the anomalously distributed coefficient in the target convolution kernel to acquire a plurality of divided coefficients that are non-anomalous;

forming a plurality of groups using the plurality of divided coefficients, wherein each of the plurality of groups comprises any one of the plurality of divided coefficients;

allocating a plurality of non-anomalously distributed coefficients in the target convolution kernel to the plurality of groups, wherein each of the plurality of groups comprises at least one of the plurality of non-anomalously distributed coefficients; and forming the plurality of sub-convolution kernels using the plurality of groups including the non-anomalously distributed coefficients and the divided coefficients;

quantizing the plurality of sub-convolution kernels individually to acquire a plurality of quantized convolution kernels, and replacing the target convolution kernel with the plurality of quantized convolution kernels; and performing speech recognition or image recognition on the edge device or the low-power device using the neural network model with the plurality of quantized convolution kernels.

2. The method of claim 1, wherein determining, in the neural network model, the target convolution kernel with anomalous coefficient distribution comprises:

acquiring any one convolution kernel to be quantized in the neural network model;

determining a first threshold value based on a standard deviation of coefficient distribution of a plurality of coefficients included in the convolution kernel to be quantized;

determining a difference value between a mean value and a maximum value and/or a minimum value of the plurality of coefficients included in the convolution kernel to be quantized; and determining, when the difference value exceeds the first threshold value, that the convolution kernel to be quantized is the target convolution kernel.

3. The method of claim 1, wherein determining the anomalously distributed coefficient in the target convolution kernel comprises:

determining a second threshold value based on a standard deviation of coefficient distribution of a plurality of coefficients included in the target convolution kernel; and determining the anomalously distributed coefficient in the target convolution kernel based on the determined second threshold.

4. The method of claim 1, wherein dividing the anomalously distributed coefficient in the target convolution kernel to acquire the plurality of divided coefficients that are non-anomalous comprises:

bisecting at least once the anomalously distributed coefficient by dichotomy until the plurality of non-anomalous divided coefficients are acquired, wherein whether the plurality of divided coefficients are non-anomalous is determined based on a second threshold.

5. The method of claim 1, wherein allocating the plurality of non-anomalously distributed coefficients in the target convolution kernel to the plurality of groups comprises:

allocating the plurality of non-anomalously distributed coefficients to the plurality of groups based on a uniform extraction operation, such that the plurality of non-anomalously distributed coefficients are uniformly distributed in the plurality of sub-convolution kernels.

6. The method of claim 1, wherein quantizing the plurality of sub-convolution kernels comprises:

determining a quantization boundary based on coefficient distribution of the plurality of sub-convolution kernels; and linearly-quantizing each of the plurality of sub-convolution kernels based on the determined quantization boundary and a target quantization bit width.

7. An apparatus for quantizing in a neural network model, the apparatus being an edge device or a low-power device with the neural network model deployed thereon, and the apparatus comprising at least one processor and a memory having instructions stored therein, wherein the instructions, when executed by the at least one processor, cause the at least one processor to:

determine, in the neural network model, a target convolution kernel with anomalous coefficient distribution, wherein the anomalous coefficient distribution negatively impacts quantization accuracy if directly quantized;

split the target convolution kernel to acquire a plurality of sub-convolution kernels comprising the following steps:

determining an anomalously distributed coefficient in the target convolution kernel;

dividing the anomalously distributed coefficient in the target convolution kernel to acquire a plurality of divided coefficients that are non-anomalous;

forming a plurality of groups using the plurality of divided coefficients, wherein each of the plurality of kernels comprises any one of the plurality of divided coefficients;

allocating a plurality of non-anomalously distributed coefficients in the target convolution kernel to the plurality of groups, wherein each of the plurality of groups comprises at least one of the plurality of non-anomalously distributed coefficients; and forming the plurality of sub-convolution kernels using the plurality of groups including the non-anomalously distributed coefficients and the divided coefficients;

quantize the plurality of sub-convolution kernels individually to acquire a plurality of quantized convolution kernels, and replace the target convolution kernel with the plurality of quantized convolution kernels; and perform speech recognition or image recognition using the neural network model with the plurality of quantized convolution kernels.

8. The apparatus of claim 7, wherein the instructions, when executed by the at least one processor, cause the at least one processor to determine, in the neural network model, the target convolution kernel with anomalous coefficient distribution by:

acquiring any one convolution kernel to be quantized in the neural network model;

determining a first threshold value based on a standard deviation of coefficient distribution of a plurality of coefficients included in the convolution kernel to be quantized;

determining a difference value between a mean value and a maximum value and/or a minimum value of the plurality of coefficients included in the convolution kernel to be quantized; and determining, when the difference value exceeds the first threshold value, that the convolution kernel to be quantized is the target convolution kernel.

9. The apparatus of claim 7, wherein the instructions, when executed by the at least one processor, cause the at least one processor to determine the anomalously distributed coefficient in the target convolution kernel by:

determining a second threshold value based on a standard deviation of coefficient distribution of a plurality of coefficients included in the target convolution kernel; and determining the anomalously distributed coefficient in the target convolution kernel based on the determined second threshold.

10. The apparatus of claim 7, wherein the instructions, when executed by the at least one processor, cause the at least one processor to divide the anomalously distributed coefficient in the target convolution kernel to acquire the plurality of divided coefficients that are non-anomalous by:

bisecting at least once the anomalously distributed coefficient by dichotomy until the plurality of non-anomalous divided coefficients are acquired, wherein whether the plurality of divided coefficients are non-anomalous is determined based on a second threshold.

11. The apparatus according to claim 7, wherein the instructions, when executed by the at least one processor, cause the at least one processor to allocate the plurality of non-anomalously distributed coefficients in the target convolution kernel to the plurality of groups by:

allocating the plurality of non-anomalously distributed coefficients to the plurality of groups based on a uniform extraction operation, such that the plurality of non-anomalously distributed coefficients are uniformly distributed in the plurality of sub-convolution kernels.

12. The apparatus according to of claim 7, wherein the instructions, when executed by the at least one processor, cause the at least one processor to quantize the plurality of sub-convolution kernels by:

determining a quantization boundary based on coefficient distribution of the plurality of sub-convolution kernels; and linearly-quantizing each of the plurality of sub-convolution kernels based on the determined quantization boundary and a target quantization bit width.

13. A non-transitory computer-readable storage medium storing instructions for quantizing in a neural network model deployed on an edge device or a low-power device, wherein the instructions, when executed by at least one processor, cause the at least one processor to:

determine, in the neural network model, a target convolution kernel with anomalous coefficient distribution, wherein the anomalous coefficient distribution negatively impacts quantization accuracy if directly quantized;

split the target convolution kernel to acquire a plurality of sub-convolution kernels comprising the following steps:

determining an anomalously distributed coefficient in the target convolution kernel;

dividing the anomalously distributed coefficient in the target convolution kernel to acquire a plurality of divided coefficients that are non-anomalous;

forming a plurality of groups using the plurality of divided coefficients, wherein each of the plurality of groups comprises any one of the plurality of divided coefficients;

allocating a plurality of non-anomalously distributed coefficients in the target convolution kernel to the plurality of groups, wherein each of the plurality of groups comprises at least one of the plurality of non-anomalously distributed coefficients; and forming the plurality of sub-convolution kernels using the plurality of groups including the non-anomalously distributed coefficients and the divided coefficients;

quantize the plurality of sub-convolution kernels individually to acquire a plurality of quantized convolution kernels, and replace the target convolution kernel with the plurality of quantized convolution kernels; and perform speech recognition or image recognition using the neural network model with the plurality of quantized convolution kernels.

14. The non-transitory computer-readable storage medium of claim 13, wherein the instructions, when executed by at least one processor, cause the at least one processor to determine, in the neural network model, the target convolution kernel with anomalous coefficient distribution by:

acquiring any one convolution kernel to be quantized in the neural network model;

determining a first threshold value based on a standard deviation of coefficient distribution of a plurality of coefficients included in the convolution kernel to be quantized;

determining a difference value between a mean value and a maximum value and/or a minimum value of the plurality of coefficients included in the convolution kernel to be quantized; and determining, when the difference value exceeds the first threshold value, that the convolution kernel to be quantized is the target convolution kernel.

15. The non-transitory computer-readable storage medium of claim 13, wherein the instructions, when executed by at least one processor, cause the at least one processor to allocate the plurality of non-anomalously distributed coefficients in the target convolution kernel to the plurality of groups by:

allocating the plurality of non-anomalously distributed coefficients to the plurality of groups based on a uniform extraction operation, such that the plurality of non-anomalously distributed coefficients are uniformly distributed in the plurality of sub-convolution kernels.

* * * * *